United States Patent
Sanders

(10) Patent No.: US 11,317,442 B2
(45) Date of Patent: Apr. 26, 2022

(54) NON-COORDINATED BACK-OFF TIMER ASSIGNMENT

(71) Applicant: ABL IP HOLDING LLC, Conyers, GA (US)

(72) Inventor: Alan David Sanders, Atlanta, GA (US)

(73) Assignee: ABL IP HOLDING LLC, Conyers, GA (US)

(*) Notice: Subject to any disclaimer, the term of this patent is extended or adjusted under 35 U.S.C. 154(b) by 0 days.

(21) Appl. No.: 16/987,740

(22) Filed: Aug. 7, 2020

(65) Prior Publication Data

US 2022/0046707 A1 Feb. 10, 2022

(51) Int. Cl.
*H04W 74/08* (2009.01)
*H04L 67/12* (2022.01)

(52) U.S. Cl.
CPC ......... *H04W 74/0816* (2013.01); *H04L 67/12* (2013.01)

(58) Field of Classification Search
CPC ............................ H04W 74/0816; H04L 67/12
USPC .............................. 370/329, 310.2; 455/550.1
See application file for complete search history.

(56) References Cited

U.S. PATENT DOCUMENTS

| | | | |
|---|---|---|---|
| 5,343,466 A | 8/1994 | Kawamura | |
| 5,974,236 A | 10/1999 | Sherman | |
| 8,259,648 B2 | 9/2012 | Pratapagiri | |
| 9,531,632 B2 | 12/2016 | Hellhake et al. | |
| 9,820,361 B1 | 11/2017 | Turvy, Jr. et al. | |
| 9,883,570 B1 | 1/2018 | Turvy, Jr. et al. | |
| 2002/0042274 A1 | 4/2002 | Ades | |
| 2003/0109270 A1 | 6/2003 | Shorty | |
| 2003/0202468 A1 | 10/2003 | Cain et al. | |
| 2004/0218548 A1 | 11/2004 | Kennedy et al. | |
| 2006/0153132 A1 | 7/2006 | Saito | |
| 2007/0097945 A1 | 5/2007 | Wang et al. | |
| 2007/0182571 A1 | 8/2007 | Kennish et al. | |
| 2007/0189256 A1 | 8/2007 | Oh | |
| 2008/0253394 A1 | 10/2008 | Spinar et al. | |
| 2009/0105567 A1 | 4/2009 | Smith et al. | |
| 2009/0175235 A1 | 7/2009 | Spinar et al. | |
| 2009/0219879 A1 | 9/2009 | Zimmerman et al. | |

(Continued)

OTHER PUBLICATIONS

Notice of Allowance for U.S. Appl. No. 16/825,264, dated Nov. 1, 2021, 8 pages.

(Continued)

*Primary Examiner* — Danh C Le
(74) *Attorney, Agent, or Firm* — RatnerPrestia

(57) ABSTRACT

An example radio frequency (RF) communication system includes a plurality of RF nodes. The plurality of RF nodes includes a receiver RF node and a sender RF node. Each RF node includes a memory coupled to a processor along with delay assignment programming in the memory, which includes functions. The functions configure the sender RF node to transmit a data packet to the receiver RF node, and to transmit a delay report message. The functions configure the receiver RF node to receive the data packet and to receive the delay report message. The receiver RF node further assigns the RF node delay value of the receiver RF node to a value not in the delay report message. Then, the receiver RF node waits a delay period of time, wherein the delay period of time corresponds to the assigned value or a multiple thereof, and additionally broadcasts the data packet.

16 Claims, 8 Drawing Sheets

(56) References Cited

U.S. PATENT DOCUMENTS

| | | | |
|---|---|---|---|
| 2012/0076007 A1 | 3/2012 | Nelson | |
| 2013/0083688 A1 | 4/2013 | Mageed Al-Talib et al. | |
| 2014/0016488 A1 | 1/2014 | Xu et al. | |
| 2014/0040483 A1 | 2/2014 | Van Dussen et al. | |
| 2015/0003309 A1 | 1/2015 | Mukherjee | |
| 2015/0208490 A1* | 7/2015 | Bishop | G08C 17/02 |
| | | | 315/153 |
| 2016/0219516 A1* | 7/2016 | Subramanian | H04W 52/0219 |
| 2016/0291127 A1 | 10/2016 | Huang et al. | |
| 2017/0265046 A1 | 9/2017 | Chen et al. | |
| 2017/0325103 A1 | 11/2017 | Casebolt et al. | |
| 2017/0353940 A1* | 12/2017 | Seth | H04L 47/283 |
| 2018/0026839 A1 | 1/2018 | Hollinger et al. | |
| 2018/0054237 A1 | 2/2018 | Tseng et al. | |
| 2018/0352414 A1* | 12/2018 | Zhang | H04W 24/02 |
| 2019/0020572 A1* | 1/2019 | Hu | H04L 45/08 |
| 2019/0069263 A1* | 2/2019 | Ylamurto | H04W 64/003 |
| 2019/0197896 A1* | 6/2019 | Bakhishev | G06K 9/00771 |
| 2019/0342709 A1* | 11/2019 | Markhovsky | G01S 5/0215 |
| 2020/0077336 A1 | 3/2020 | Moner Poy et al. | |
| 2020/0112508 A1* | 4/2020 | di Marco | H04W 28/021 |
| 2020/0135028 A1* | 4/2020 | Bakhishev | G08G 1/042 |
| 2020/0162997 A1 | 5/2020 | Damnjanovic | |
| 2020/0186378 A1 | 6/2020 | Six et al. | |
| 2020/0226895 A1 | 7/2020 | Masters | |
| 2020/0274612 A1* | 8/2020 | Shah | H04W 72/12 |
| 2021/0282032 A1 | 9/2021 | Wen et al. | |
| 2021/0345293 A1 | 11/2021 | Park et al. | |
| 2021/0352716 A1* | 11/2021 | Baldemair | H04W 74/0808 |
| 2021/0385662 A1 | 12/2021 | Furuichi | |
| 2021/0385888 A1 | 12/2021 | Akl et al. | |

OTHER PUBLICATIONS

Canadian Examination Report for Application No. 3,094,674, dated Nov. 5, 2021, 5 pages.

Canadian Examination Report for Application No. 3,095,747, dated Nov. 8, 2021, 5 pages.

Canadian Examination Report for Application No. 3,094,882, dated Nov. 5, 2021, 5 pages.

Non Final Office Action for U.S. Appl. No. 16/662,691, dated Mar. 8, 2021, 11 pages.

Notice of Allowance for U.S. Appl. No. 16/662,691, dated Mar. 29, 2021, 5 pages.

Notice of Allowance for U.S. Appl. No. 16/811,072, dated May 12, 2021, 10 pages.

Qayyum et al. "Multipoint relayig for flooding broadcast messages in mobile wireless networks," 35th Annual Hawaii International Conference on System Sciences (HICSS'2002), Jan. 2002, Maui, United States, pp. 3386-3875.

Non-Final Office Action for U.S. Appl. No. 16/825,264, dated Jul. 23, 2021, 34 pages.

Non Final Office Action for U.S. Appl. No. 16/984,252, dated Dec. 24, 2021, 42 pages.

* cited by examiner

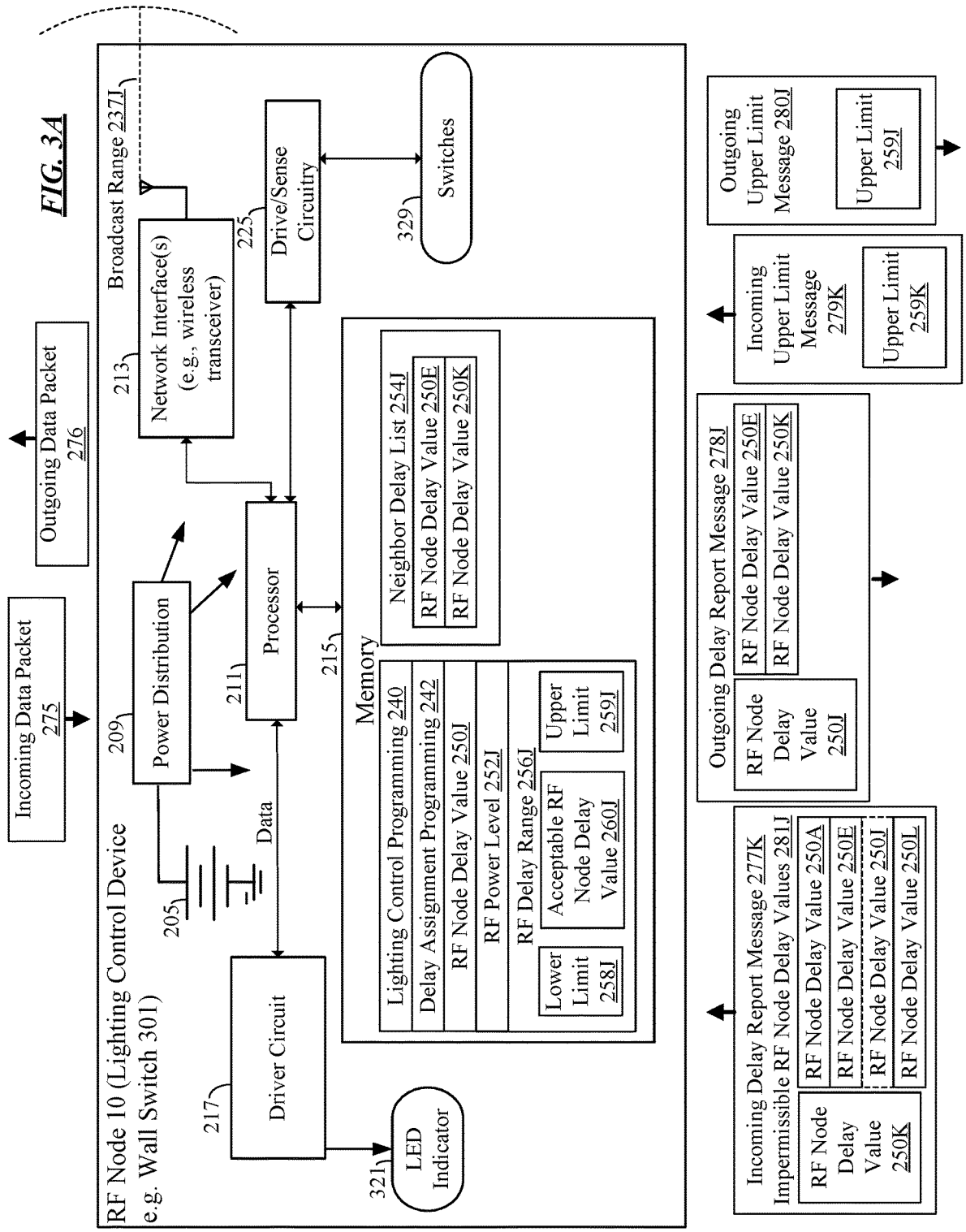

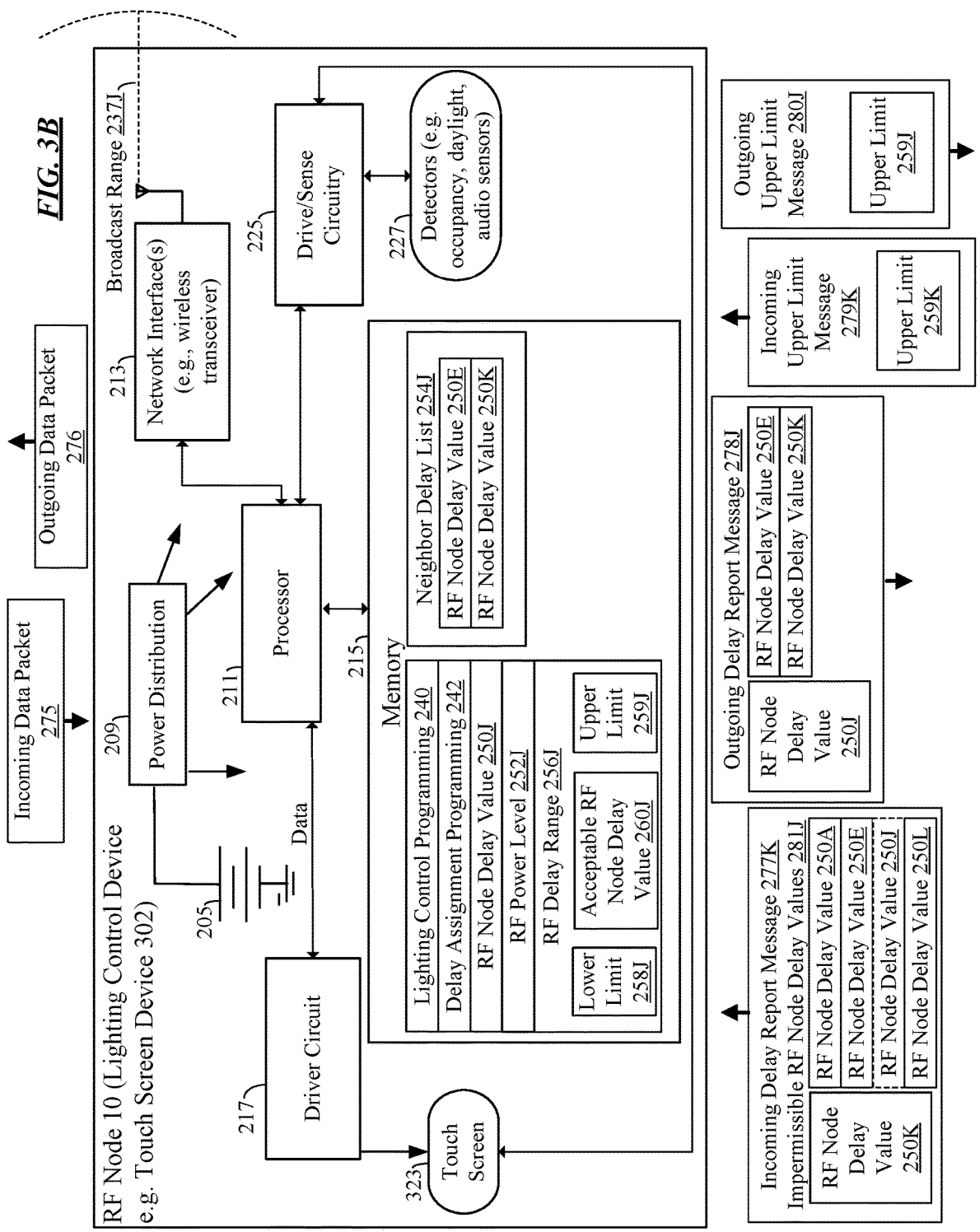

NON-COORDINATED BACK-OFF TIMER ASSIGNMENT

TECHNICAL FIELD

The present subject matter relates to techniques and equipment to improve message collision performance of luminaire-based flooding wireless networks, particularly by reducing packet collisions.

BACKGROUND

In a conventional system, transmitting devices avoid collisions using carrier-sense technology. Before sending a message, a device measures the signal level in the frequency channel it intends to transmit. If the signal level is above some threshold, the device will start a random delay timer, then will attempt the transmission again. This algorithm has three problems. The first problem is that a potentially interfering signal may be weak at the transmitter location, where carrier-sense would be performed, but still interfere at the intended receiver of that transmission. Two transmitters can be located out of coverage range of each other, while an intended receiver of a packet is within the coverage range of both of those transmitters. The second problem is that carrier-sense uses a received signal-level threshold to determine whether the frequency channel is clear. If a device measures a signal level above that threshold in the channel of interest, the transmitter will backoff and delay transmission. If that signal level threshold is set high, the transmitter will not backoff when real interfering signals are present. However, if that signal level threshold is set too low, for example below the average ambient noise and interference level, then that transmitter may never transmit. The third problem is that in a repeater system, two repeating devices will receive and attempt to re-transmit the packet at nearly precisely the same time. In this case, there would be no period of time to make the carrier-sense measurement. That is, each device would simultaneously determine that the channel was clear and each would simultaneously retransmit, causing a collision.

SUMMARY OF INVENTION

Hence, there is still a need for further improvement in technologies for collision prevention within luminaire-based flooding wireless networks.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIG. 3A illustrates a functional block diagram of a lighting system wall switch RF node as well as network messages and packets the RF node sends and receives.

FIG. 3B illustrates a functional block diagram of a lighting system touch screen device RF node as well as network messages and packets the RF node sends and receives.

DETAILED DESCRIPTION

Figure 1:
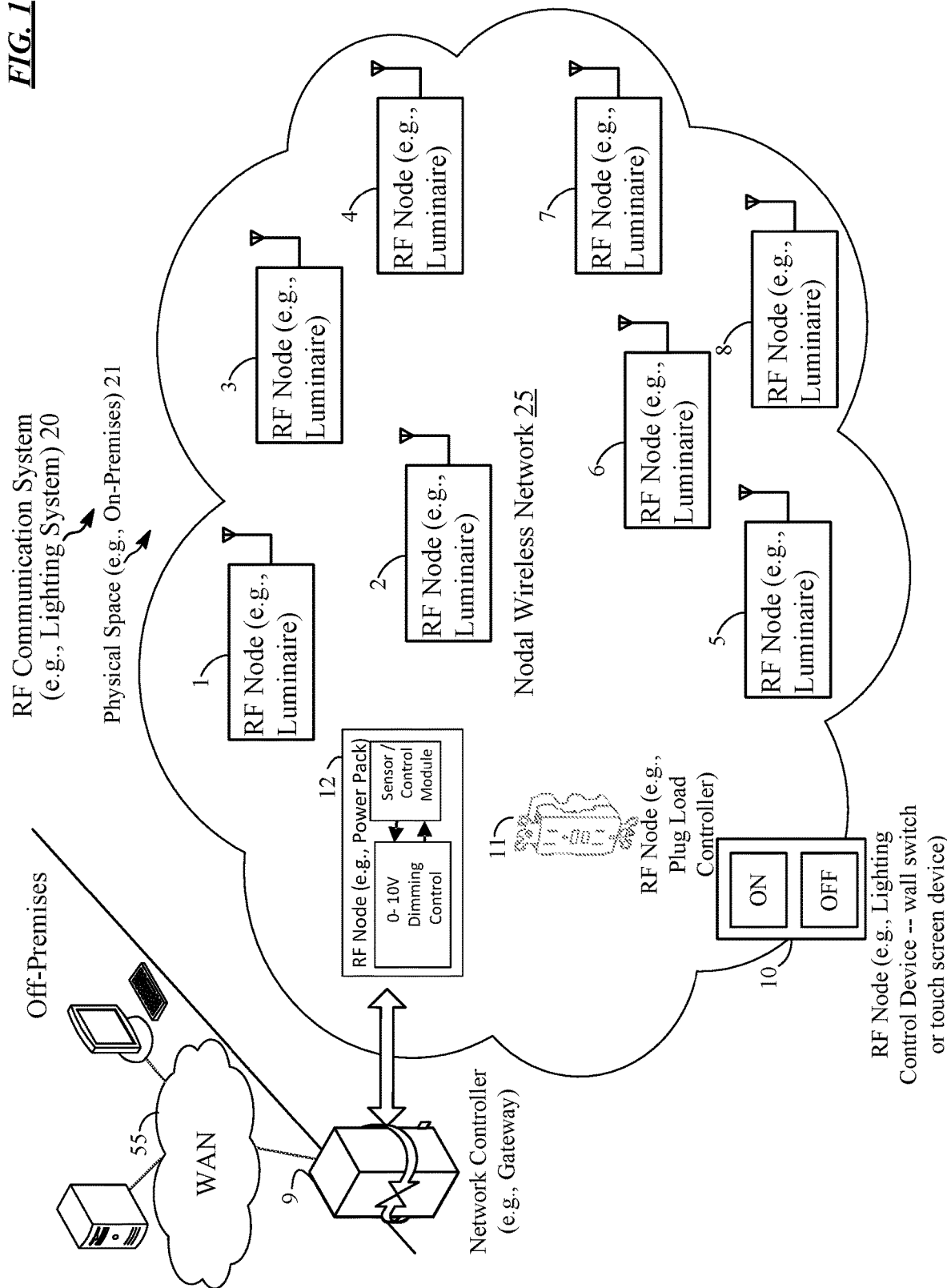
FIG. 1 illustrates a functional block diagram of an example of a radio-frequency (RF) communication system (e.g., wireless lighting system) that includes a nodal wireless network of RF nodes.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Although the discussion herein is focused on light fixture type luminaires that have a fixed position in a space, it should be understood that other types of luminaires can be used/sensed in lieu of light fixtures, such as lamps, particularly if the lamps have a fixed position in the space. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaries in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "lighting system," as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting," as used herein, are intended to encompass essentially any type of lighting in which a luminaire produces light by processing of electrical power to generate the light. A luminaire for artificial lighting, for example, may take the form of a lamp, light fixture, or other luminaire that incorporates a light source, where the light source by itself includes no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output of the light source of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). The electronics for driving and/or controlling the lighting component(s) may be incorporated within the luminaire or located separately and coupled by appropriate means to the light source component(s).

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

FIG. 1 illustrates a functional block diagram of an example of an RF communication system (e.g., lighting system) 20 that includes a nodal wireless network 25 of radio frequency (RF) nodes. The nodal wireless network 25 supports light commissioning/control/maintenance to provide a variety of lighting control, including communications in support of turning lights on/off, dimming, set scene, and sensor trip events. In the example, the twelve RF nodes 1-8, 10-12 include eight luminaires 1-8, a gateway (e.g., network controller) 9, lighting control device 10 (e.g., wall switch or touch screen device), a plug load controller 11, and a power pack 12. The number of RF nodes 1-12 in the nodal wireless network 25 (e.g., size) will vary as RF nodes join or leave the nodal wireless network 25; thus, the number of RF nodes may be greater or less than the twelve RF nodes shown.

RF nodes 1-12 can execute delay assignment programming (element 242 of FIGS. 2, 3A-B, 4, 5, 6) to assign appropriate RF node delay values (element 250A of FIG. 2) and a lighting control application (element 240 of FIGS. 2, 3A-B, 4, 5, 6) for communication over the nodal wireless network 25. In a nodal wireless network 25, algorithms are used to assign certain RF node delay values 250A to specific RF nodes. The node delay values 250A may vary depending on the RF signal strength in various locations of the physical space 21 where the RF nodes 1-12 are positioned, and based on the proximity of those RF nodes 1-12 to each other within the physical space 21.

The node delay values 250A are transmitted within delay report messages (element 277A of FIG. 2, element 278A of FIG. 4) between RF nodes 1-12 during the delay assignment process. The RF node 1 that transmits a given outgoing delay report message 278A is a sender RF node with respect to that delay report message 278A, and the RF node 11 that receives that given outgoing delay report message 278A as an incoming delay report message 277A is a receiver RF node.

In a lighting system 20, where various luminaires (element 201 of FIG. 2), lighting control devices (e.g., wall switch 301 of FIG. 3A or touch screen device 302 of FIG. 3B)), plug load controllers (element 401 of FIG. 4), power packs (element 501 of FIG. 5) and gateway servers (element 601 of FIG. 6) are RF nodes 1-12, without proper messaging delays can result in multiple nodes forwarding messages to one or more nodes at almost the exact same time, which can result the recipients of those messages forwarding each message to one or more nodes, including the original sender of the messages. This can result in a broadcast storm, where an exponential number of copies of substantially the same messages are forwarded through the nodal wireless network 25, potentially crippling the nodal wireless network 25. Proper message delays allow nodes to stagger these messages, and be able to determine whether, when they attempt to forward a message, they are attempting to forward a message that has already been forwarded by that particular RF node.

Though the nodal wireless network 25 is described as wireless, some or all of the RF nodes 1-12 may communicate over a wired connection instead of or in addition to utilizing a wireless connection.

This nodal wireless network 25 can be applied to lighting systems 20, but in some examples the nodal wireless network 25 can be applied to a wireless industrial device control system as well.

RF nodes 1-12 are installed in a physical space (e.g., on-premises) 21, which can be in indoor or outdoor installation area. Each RF node, such as luminaires 1-8, lighting control device 10, plug load controller 11, power pack 12, and gateway server 9 can be equipped with a wireless network transceiver. For example, the wireless network transceiver can include a near range Bluetooth Low Energy (BLE) radio that communicates over the nodal wireless network 25 for purposes of commissioning, maintenance, and control operation of the lighting system 20.

Plug load controller 11 plugs into existing AC wall outlets, for example, and allows existing wired lighting devices, such as table lamps or floor lamps that plug into a wall outlet, to operate in the lighting system 20. Plug load controller 11 instantiates a wired lighting device, such as a table lamp or floor lamp, by allowing for commissioning and maintenance operations and processes wireless lighting controls in order to the allow the wired lighting device to operate in the lighting system 20.

Power pack 12 retrofits with existing wired light fixtures (luminaires). Power pack 12 instantiates the wired light fixture by allowing for commissioning and maintenance operations and processes wireless lighting controls in order to allow a wired lighting device to operate in the lighting system 20.

It should be understood that in the example herein, the luminaires 1-8, lighting control device 10, plug load controller 11, power pack 12, and gateway server 9 are just one example of an RF node, which includes additional components. Hence, the delay assignment programming 242 described herein can be applied to various other types of RF nodes.

Generally, RF nodes 1-12 include a subset of components, for example, as shown in FIGS. 2, 3A-B, 4, 5, 6. The RF node includes a wireless transceiver 213, processor 211, and a memory 215 (see FIGS. 2, 3A-B, 4, 5, 6). Hence, the RF nodes 1-12 do not have to include the light source 219, LED indicator 321, touch screen 323, driver circuit 217, drive/sense circuitry 225, detector(s) 227, and switch(es) 329 components (see FIGS. 2, 3A-B, 4, 5). RF nodes can be connected together via the nodal wireless network 25.

Therefore, FIG. 1 depicts a radio frequency communication system 20, comprising a plurality of RF nodes 1-12 connected via a nodal wireless network 25. The plurality of RF nodes 1-12 includes a receiver RF node 11 and a sender RF node 1 with respect to a particular incoming delay report message 277A. With respect to a different incoming delay report message 277L a different RF node 12 is the sender RF node and a different RF node 9 is the receiver RF node.

Figure 2:
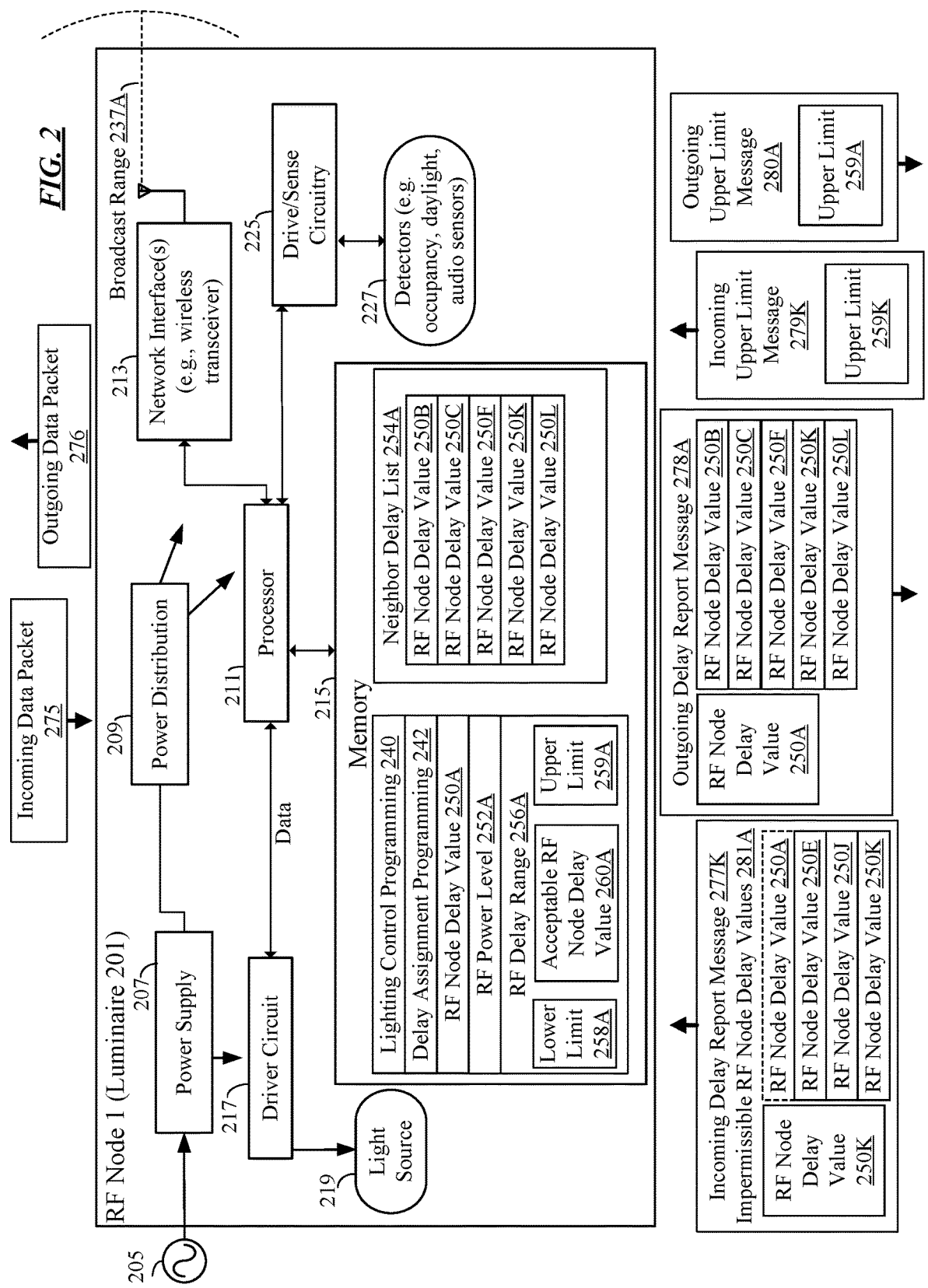
FIG. 2 illustrates a functional block diagram of a lighting system luminaire RF node as well as network messages and packets the RF node sends and receives.

FIG. 2 is a block diagram of RF node 1, which is a luminaire 201 in the example. While FIG. 2 depicts RF node 1, RF nodes 2-8 have the same physical structure elements as RF node 1, and are also luminaires 201. RF node 1 differs from RF nodes 2-8 in terms of the RF node delay value 250A, RF power level 252A, RF delay range 256A, the values within the RF delay range 256A, and the neighbor delay list 254A of the memory 215, and the node delay values 250A,E,J,K of the incoming delay report message 277K, the node delay values 250A,B,C,D,F,K,L of the outgoing delay report message 278A, as well as the upper limit 259K of the incoming upper limit message 279K and the upper limit of the outgoing upper limit message 280A, which have contents specific to the particular RF node 1-8. The values, ranges, and lists shown in FIG. 2 are specific to RF node 1.

The RF node 1 includes a subset of the components of the luminaire RF node 201 of FIG. 2, including the processor 211, network interface(s) 213, and various programming, messages, identifiers, etc. shown in the main memory 215. In FIG. 2, drive/sense circuitry 225 and detectors 227 can be on-board the luminaire 201. Detectors 227 can be infrared sensors for occupancy or motion detection, an in-fixture daylight sensor, an audio sensor, a temperature sensor, or other environmental sensor. Drive/sense circuitry 225, such as application firmware, drives the occupancy, audio, and photo sensor hardware.

The luminaire 201 includes a power supply 207 driven by a power source 205. Power supply 207 receives power from the power source 205, such as an AC mains, battery, solar panel, or any other AC or DC source. Power supply 207 may include a magnetic transformer, electronic transformer, switching converter, rectifier, or any other similar type of circuit to convert an input power signal into a power signal suitable for light source 219. Light source 219 includes electrical-to-optical transducers include various light emitters, although the emitted light may be in the visible spectrum or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

A lamp or "light bulb" is an example of a single light source. An LED light engine may use a single output for a single source but typically combines light from multiple LED type emitters within the single light engine. Light source 219 can include light emitting diodes (LEDs) that emit red, green, and blue (RGB) light or tunable white light. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output.

Luminaire 201 further includes a driver circuit 217 which is, for example, an intelligent light emitting diode (LED) driver circuit. Driver circuit 217 is coupled to light source 219 and drives that light source 219 by regulating the power to light source 219 by providing a constant quantity or power to light source 219 as its electrical properties change with temperature, for example. The driver circuit 217 provides power to light source 219. Driver circuit 217 may be a constant-voltage driver, constant-current driver, or AC LED driver type circuit that provides dimming through a pulse width modulation circuit and may have many channels for separate control of different LEDs or LED arrays that comprise light source 219. An example of a commercially available intelligent LED driver circuit 217 is manufactured by EldoLED®.

Driver circuit 217 can further include an AC or DC current source or voltage source, a regulator, an amplifier (such as a linear amplifier or switching amplifier), a buck, boost, or buck/boost converter, or any other similar type of circuit or component. Driver circuit 217 outputs a variable voltage or current to the light source 219 that may include a DC offset, such that its average value is nonzero, and/or an AC voltage.

For purposes of communication and control, luminaire 201 is treated as a single or a multi-addressable device that can be configured to operate as a member of the nodal wireless network 25. Luminaire 201 includes power distribution circuitry 209, a processor 211, and a memory 215. As shown, processor 211 is coupled to driver circuit 217 and the processor 211 includes a central processing unit (CPU) that controls the light source operation of the light source 219. Memory 215 can include volatile and non-volatile storage.

The power distribution circuitry 209 distributes power and ground voltages to the processor 211, memory 215, network communication interface(s) 213 (e.g., wireless transceivers), drive/sense circuitry 225, and detector(s) 227 to provide reliable operation of the various circuitry on the luminaire RF node 201.

Network communication interface(s) 213 allows for data communication (e.g., wired or wireless) over various networks, including the nodal wireless network 25. For example, luminaire 201 can includes one band, dual-band, or tri-band wireless radio communication interface system of network communication interface(s) 213 configured for wireless communication via separate radios that operate at three different frequencies, such as sub-GHz (e.g., 900 MHz), Bluetooth Low Energy (BLE) (2.4 GHz), and 5 GHz, for example. At least one wireless transceiver 213 is for communication over the nodal wireless network 25.

Figure 6:
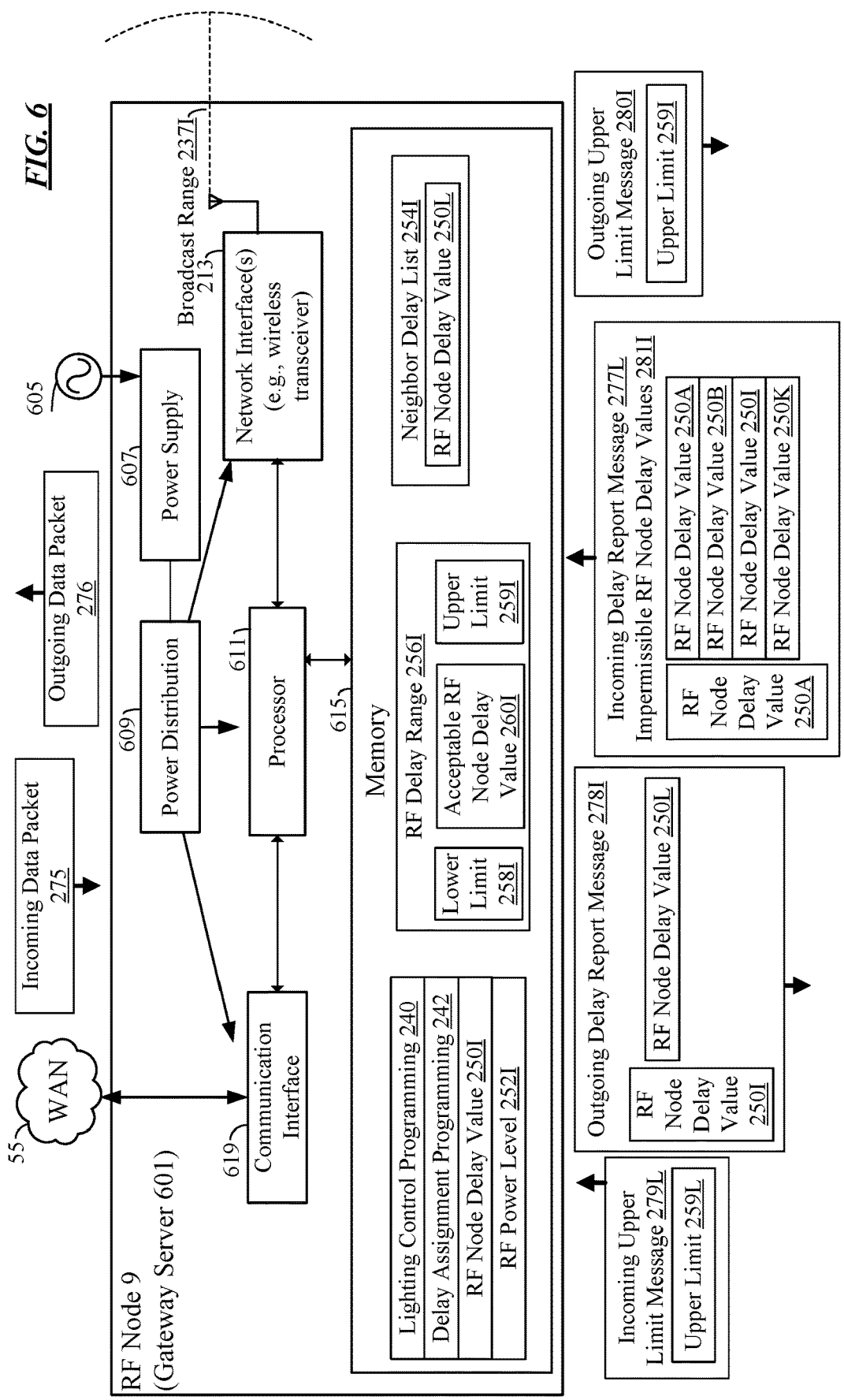
FIG. 6 illustrates a functional block diagram of a gateway server RF node as well as network messages and packets the RF node sends and receives.

Processor 211, including like that shown for the processor 611 of gateway server 601 in FIG. 6, serve to perform various operations, for example, in accordance with instructions or programming executable by processors 211, 611. For example, such operations may include operations related to communications with various lighting system 20 elements, such as RF nodes 1-12 during the registration and repeater designation procedures described herein. Although a processor 211, 611 may be configured by use of hardwired logic, typical processors are general processing circuits configured by execution of programming. Processors 211, 611 include elements structured and arranged to perform one or more processing functions, typically various data processing functions. Although discrete logic components could be used, the examples utilize components forming a programmable CPU. A processor 211, 611 for example includes one or more integrated circuit (IC) chips incorporating the electronic elements to perform the functions of the CPU. The processors 211, 611 for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in RF nodes 1-12.

Memory 215 like that shown in FIGS. 2, 3A-B, 4, 5 and memory 615 like that shown in FIG. 6 are for storing data and programming. In the example, the main memory system 215, 615 may include a flash memory (non-volatile or persistent storage) and a random access memory (RAM) (volatile storage). The RAM serves as short term storage for instructions and data being handled by the processor 211, 611, e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions, programming, or application(s) may be software or firmware used to implement any other device functions associated with RF nodes 1-12, including luminaire 201 wall switch 301, touch screen device 302, plug load controller 401, power pack 501 and gateway server 601. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 215, or a memory of a computer used to download or otherwise install such programming into the RF nodes 1-12, or a transportable storage device or a communications medium for carrying program for installation in the RF nodes 1-12.

As shown, the luminaire 201 includes programming in the memory 215, which configures the processor 211 to control operations of the light source 219, including the communications over the network communication interface(s) 213 via the wireless network interface(s) 213. The programming in the memory 215 also includes lighting control programming 240 to control the light source 219.

This exemplar luminaire RF node 201 includes delay assignment programming 242 to configure the luminaire RF node 201 to facilitate the delay assignment process. Every RF node 1-12 in the RF communication system has the delay assignment programming 242, and also has an individualized version of the RF node delay value 250A, RF power level 252A, RF delay range 256A, and neighbor delay list 254A, specific to a particular RF node 2-12 and based on the RF nodes 1-12 around that particular RF node 2-12. While the values, ranges, and lists in the memory 215 have particular values for each RF node 1-12, the values are not necessarily unique: multiple RF nodes 1-12 may have the same RF power level 252A, or the same RF node delay value 250A, for example. The constant is that each RF node 1-12 has some RF power level 252A, and some RF node delay value 250A, and the constant across RF nodes 1-12 is not the particular numerical value pointed to by the RF power level 252A or the RF node delay value 250A.

The memory 215 also stores an RF node delay value 250A. This RF node delay value 250A indicates how long the luminaire RF node 201 must wait until rebroadcasting a message sent for rebroadcasting over the nodal wireless network 25. The delay corresponds to the RF node delay value 250A, and in this example is a multiple of the RF node delay value 250A. If the node delay value 250A is "3", then the luminaire waits a period of time equal to that node delay value 250A of "3" multiplied by, in this example, a static value of one millisecond. Therefore, the node delay value 250A of "3" results in a 3 millisecond delay between the luminaire RF node 201 receiving a message intended for forwarding, and the luminaire RF node 201 forwarding that message.

The memory 215 further comprises an RF power level 252A: this RF power level 252A is used by the network interface 213 to determine how much power is used by the wireless transceiver of the network interface 213, and consequently determines how large the broadcast range 237A of the luminaire RF node 201 will be. If the RF power level 252A value is decreased, the broadcast range 237A of the luminaire RF node 201 will also be decreased.

In this example, the RF node delay value 250A must be within an RF delay range 256A, which the memory 215 further comprises. The RF delay range 256A has a lower limit 258A and an upper limit 259A. The RF delay range 256A in this example is made up of all positive integers between "1" and the number of RF nodes 1-12 in the RF communication system 20, or "12". Therefore, the RF node delay value 250A must be "1", "2", "3", "4", "5", "6", "7", "8", "9", "10", "11", or "12", so long as no RF nodes 1-12 are added or removed from the RF communication system 20.

The RF node 1 also receives incoming delay report messages 277K from neighbor RF nodes 2-4, 6, 11-12. Neighbor RF nodes 2-4, 6, 11-12 are the RF nodes 2-4, 6, 11-12 that have the RF node 1 within their respective broadcast ranges 237. Different RF nodes 2-12 potentially have different neighbor RF nodes.

As RF node 1 receives incoming delay report messages 277K from neighbor RF node 11, RF node 1 adds the RF node delay value 250K from the incoming delay report message 277K to the neighbor delay list 254A. As delay report messages (such as delay report message 278J from FIG. 3A) are received, the RF node 1 builds the neighbor delay list 254A, which will ultimately comprise the RF node delay value 250B of RF node 2, RF node delay value 250C of RF node 3, RF node delay value 250F of RF node 6, RF node delay value 250K of RF node 11, and RF node delay value 250L of RF node 12.

RF node 1 also stores the incoming delay report message 277K, and treats the RF node delay values 250E,J,K as impermissible RF node delay values 281A. RF node 1 determines that the RF node delay value 250A within the incoming delay report message 277K is the RF node delay value 250A of RF node 1, and therefore does not include its own RF node delay value 250A among the impermissible RF node delay values 281A. As RF node 1 receives more incoming delay report messages (such as delay report message 278J from FIG. 3A), the RF node delay values 250E,J K in those messages 278J will be added to the impermissible RF node delay values 281A if they are not already present.

RF node 1 also is capable of sending out an outgoing upper limit message 280A, containing the upper limit 259A of RF node 1. RF node 1 may do this if the upper limit 259A needs to be increased, and this will affect other RF nodes 2-12 in the RF communication system 20. Likewise, RF node 1 may also receive an incoming upper limit message 279K containing an upper limit 259K, and once received RF node 1 may set upper limit 259A equal to upper limit 259K, if upper limit 259A is less than upper limit 259K. In some examples, RF node 1 may set upper limit 259A equal to upper limit 259K regardless of the comparative size relationship between the two values.

The RF node 1 also capable of receiving an incoming data packet 275, which is intended to be forwarded. After receiving the incoming data packet 275, the RF node 1 waits a period of time proportional to the RF node delay value 250A, then sends out the data packet as an outgoing data packet 276. If the RF node delay value 250A is "3", and the proportion of time is one millisecond, then the RF node 1 will receive the incoming data packet 275, wait 3 milliseconds, then broadcast the outgoing data packet 276.

The RF node 1 is capable of being both a sender RF node and a receiver RF node, depending on whether the RF node is sending an outgoing delay report message 278A, or receiving an incoming delay report message 277K. There is no differentiation within hardware, software or programming between sender RF nodes and receiver RF nodes: the distinction is only relevant with regards to a given message 277K, 278A, 279K, 280A or data packet 275, 276.

Therefore, when considering the RF node 1 as a sender RF node 1, the RF node 1 of FIG. 2 includes an RF node processor 211, as well as an RF node wireless transceiver 213 configured for data communication over the nodal wireless network 25, coupled to the RF node processor 211 of the RF node 1. Additionally, the RF node 1 includes an RF node memory 215 coupled to the RF node processor 211, which includes a respective RF node delay value 250A and a respective delay period of time.

The RF node memory 215 further includes delay assignment programming 242. Execution of the delay assignment programming 242 by the RF node processor 211 of the RF node 1 acting as a sender RF node 1 configures the sender RF node 1 to implement functions, including the sender RF node 1 transmitting a data packet to a receiving RF node 11, and sender RF node transmitting a delay report message 278A, 277A that includes a sender delay list of impermissible RF node delay values 281K of respective neighbors 2-4, 6, 11, 12 of the sender RF node 1, wherein the respective neighbors 2-4, 6, 11, 12 are within a respective broadcast range 237A of the sender RF node 1.

The RF node memory still further includes a respective RF node delay range 256A that includes a lower limit 258A and an upper limit 259A.

The outgoing delay report message 278A sent by the sender RF node 1 further includes a sender RF node delay value 250A, which is the RF node delay value 250A of the sender RF node 1.

Execution of the delay assignment programming 242 by the RF node processor 211 of the sender RF node 1 configures the sender RF node 1 to further implement functions, including the sender RF node 1, during initialization, waiting an initialization period of time prior to transmitting the delay report message 278A that is sufficient to avoid collisions by the plurality of RF nodes 1-12. The initialization period of time is longer than the respective delay period of time of each of the plurality of RF nodes. This is because as the RF communication system 20 is configuring the RF node delay value 250A of each RF node 1-12 within the nodal wireless network 25, there is no established delay period for each RF node 1-12. Therefore, each RF node 1-12 waits a substantially longer period of time to send their outgoing delay report messages 278A: instead of waiting one to 12 milliseconds, the RF nodes 1-12 may wait a random period of time between one and twelve seconds, or one and twelve minutes. Making the messaging time window so large during initialization (e.g. the messaging windows are between 1 and 12 minutes, and the messages take one millisecond to send, then there are 660,000 different messaging windows for twelve messages: highly unlikely two will be sent at the same time) all but ensures that packet collisions will not occur during initialization. This RF communication system 20 is therefore well suited to wireless industrial device communication systems, or wireless lighting communication systems: these types of systems need to be efficient, but the number of RF nodes 1-12 in the RF communication system 20 will be relatively static, and so requiring that setup take over an hour of delay messaging to optimize the nodal wireless network 25 performance is not an unreasonable burden so long as the RF communication system 20 has a long service life. Particularly, in wireless lighting systems wherein the plurality of RF nodes 1-12- includes a luminaire 201 and a lighting control device 301, the luminaire 201 includes a light source 219, and the lighting control device 301 is coupled to control the luminaire 201 via the nodal wireless network 25, this RF communication system 20 is particularly suited: the luminaire 201 and lighting control device 301 are likely permanently installed in their locations, and so will not be changing their networking relationship frequently. Additionally, lighting control devices 301 like light switches are expected to have extremely quick performance in turning on and off the light source 219 of a luminaire 201: therefore minimizing the delays needed to avoid packet collisions is paramount in improving user experience.

FIGS. 3A-B are block diagrams of two types of lighting control devices 10 that communicate via the flooding wireless network 25 of FIG. 1, specifically a wall switch 301 and touchscreen device 302. The circuitry, hardware, and software of the lighting control devices 301-302, shown are similar to the luminaire 201, including the memory 315. Hence, main memory 315 is shown as including the lighting control programming 240. As shown, wall switch 301 and touchscreen device 302 can include a subset of the circuitry, hardware, and software shown for the luminaire 201 of FIG. 2.

As shown in FIG. 3A, the RF node 10 is a wall switch 301 where the drive/sense circuitry 225 responds to switches 329. Switches 329 can be an on/off switch, dimmer switch, or set scene switch based on Acuity Brands Lighting's commercially available nLight® AIR rES7 product. In some examples, wall switch 301 includes a single shared button switch 329 for on/off, dimming, or set scene functions and the LED indicator 321 of wall switch 301. A button station can include various button settings that can have the lighting control settings adjusted, for example, four buttons can be arranged with two longitudinal buttons (north-south) and two lateral buttons (east-west).

In FIG. 3B, the lighting control device 10 is a touchscreen device 302 where lighting control setting adjustments are inputted via a user interface application (not shown) through manipulation or gestures on a touch screen 323. For output purposes, the touch screen 323 includes a display screen, such as a liquid crystal display (LCD) or light emitting diode (LED) screen or the like. For input purposes, touch screen 323 includes a plurality of touch sensors.

A keypad may be implemented in hardware as a physical keyboard of touch screen device 302, and keys may correspond to hardware keys of such a keyboard. Alternatively, some or all of the keys (and keyboard) of touchscreen device 300B may be implemented as "soft keys" of a virtual keyboard graphically represented in an appropriate arrangement via touch screen 323. The soft keys presented on the touch screen 323 may allow the user of touchscreen device 302 to invoke the same user interface functions as with the physical hardware keys.

Drive/sense circuitry 225 is coupled to touch sensors of touch screen 323 for detecting the occurrence and relative location/position of each touch with respect to a content display area of touch screen 323. In this example, drive/sense circuitry 225 is configured to provide processor 211 with touch-position information based on user input received via touch sensors. In some implementations, processor 211 is configured to correlate the touch position information to specific content being displayed within the content display area on touch screen 323. The touch-position information captured by the drive/sense circuitry 225 and provided to processor 211 may include, but is not limited to, coordinates identifying the location of each detected touch with respect to the display area of touch screen 323 and a timestamp corresponding to each detected touch position.

In general, touch screen 323 and its touch sensors (and one or more keys, if included) are used to provide a textual and graphical user interface for the touchscreen device 302. In an example, touch screen 323 provides viewable content to the user at lighting control device 10. Touch screen 323 also enables the user to interact directly with the viewable content provided in the content display area, typically by touching the surface of the screen with a finger or an implement such as a stylus.

Memory 215 is shown as including the lighting control programming 240. The memory 215 includes the delay assignment programming 242, RF node delay value 250J, RF power level 252J RF delay range 256J, and neighbor delay list 254J, which have the same structure as the similar element in FIG. 2, but may contain different particular values. The RF node 10 is also capable of receiving the same incoming delay report message 277K and incoming upper limit message 279K that the RF node 1 from FIG. 2 receives, and can send an outgoing delay report message 278J and outgoing upper limit message 280J like the RF node from FIG. 2. Furthermore, the RF node 10 also receives incoming data packet 275 and broadcasts that data packet as an outgoing data packet 276. All of the memory structures and programming within the memory 215 are the same as that of FIG. 2, except for the fact that RF node 10 has RF node 5 and RF node 11 as neighbors, resulting in the neighbor delay list 254J containing the RF node delay value 250E of RF node 5 and RF node delay value 250K of RF node 11.

Figure 4:
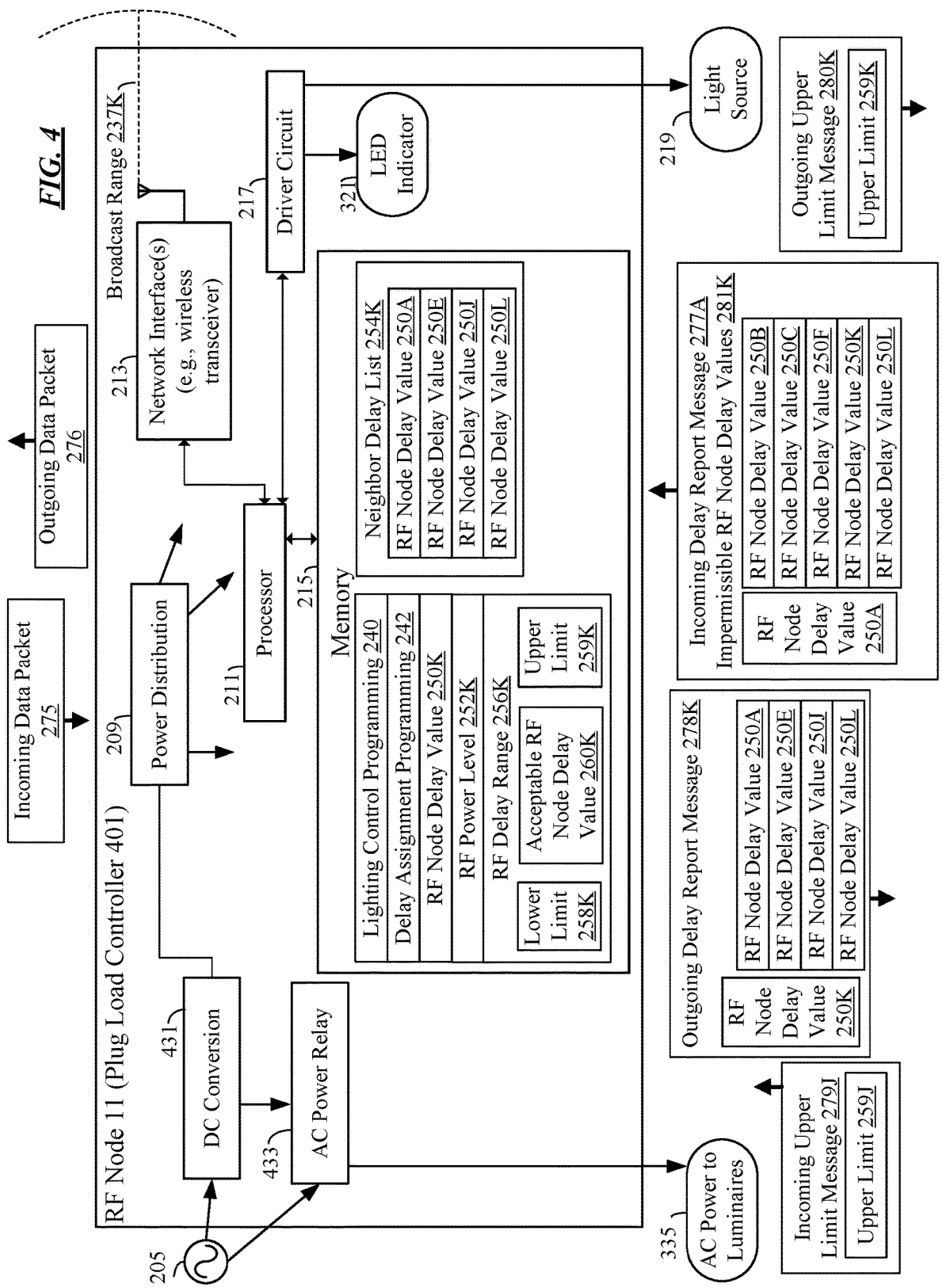
FIG. 4 illustrates a functional block diagram of a lighting system plug load controller RF node as well as network messages and packets the RF node sends and receives.

FIG. 4 is a block diagram of a plug load controller 401 type of RF node 11 that communicates via the flooding wireless network 25 of FIG. 1. The circuitry, hardware, and software of plug load controller 401 shown is similar to the luminaire 201 of FIG. 2. Hence, main memory 215 is shown as including the lighting control programming 240.

Plug load controller 401 is a retrofit device that plugs into existing AC wall outlets, for example, and allows existing wired lighting devices, such as table lamps or floor lamps that plug into a wall outlet, to operate in the lighting control system. The plug load controller 401 instantiates the table lamp or floor lamp by allowing for commissioning and maintenance operations and processes wireless lighting controls in order to the allow the lighting device to operate in the lighting system 20. As shown, plug load controller 401 includes a DC conversion circuit 431 (which may instead be a power supply) driven by a power source 205, in our example, an AC line or mains. Power source 205, however, may be a battery, solar panel, or any other AC or DC source.

DC conversion circuit 431 receives power from the power source 205, and may include a magnetic transformer, electronic transformer, switching converter, rectifier, or any other similar type of circuit to convert an input power signal into a suitable power signal to power itself. Plug load controller 401 further comprises an AC power relay 433, which relays incoming AC power from power source 205 to other devices that may plug into the receptacle of plug load controller 401 thus providing an AC power outlet 335.

Plug load controller 401 further includes a driver circuit 217 to drive the external light source 219 of the table or floor lamp, for example. The LED indicator 321 indicates the state of the plug load controller 400A, for example, during commissioning and maintenance procedures.

Memory 215 is shown as including the lighting control programming 240. The memory 215 includes the delay assignment programming 242, RF node delay value 250K, RF power level 252K RF delay range 256K, and neighbor delay list 254K, which have the same structure as the similar element in FIG. 2, but may contain different particular values. The RF node 11 is also capable of receiving the same incoming delay report message 277A and incoming upper limit message 279A that the RF node 1 from FIG. 2 sends, and can send an outgoing delay report message 278K and outgoing upper limit message 280K like the RF node 1 from FIG. 2. Furthermore, the RF node 11 also receives incoming data packet 275 and broadcasts that data packet as an outgoing data packet 276. All of the memory structures and programming within the memory 215 are the same as that of FIG. 2, except for the fact that RF node 11 has RF node 1, RF node 5, RF node 10 and RF node 12 as neighbors, resulting in the neighbor delay list 254J containing the RF node delay value 250A of RF node 1, the RF node delay value 250E of RF node 5, RF node delay value 250J of RF node 10, and RF node delay value 250L of RF node 12.

The RF node 11 is capable of being both a sender RF node and a receiver RF node, depending on whether the RF node is sending an outgoing delay report message 278K, or receiving an incoming delay report message 277A. There is no differentiation within hardware, software or programming between sender RF nodes and receiver RF nodes: the distinction is only relevant with regards to a given message 277A, 278K, 279A, 280K or data packet 275, 276.

Therefore, when considering the RF node 11 as a receiver RF node 1, the RF node 11 of FIG. 4 includes delay assignment programming 242 in the RF node memory 215, wherein execution of the delay assignment programming 242 by the RF node processor 211 of the RF node 11 acting as a receiver RF node configures the receiver RF node 11 to implement functions, including the receiver RF node 11 receiving the data packet 275 from the sender RF node 1, and the sender RF node 11 receiving the delay report message 277A from the sender RF node 1. Additionally, the functions include the receiver RF node 11 assigning the respective RF node delay value 250K of the receiver RF node 11 to a respective acceptable RF node delay value 260K that is different than each of the impermissible RF node delay values 281K within the sender delay list 254A included in the incoming delay report message 277A. Furthermore, the functions include the receiver RF node 11 in response to assigning the respective RF node delay value 250L, waiting the respective delay period of time, wherein the respective delay period of time corresponds to the assigned respective RF node delay value 250K or a multiple thereof, and in response to waiting the respective delay period of time, broadcasting the data packet 276. To illustrate, if the multiple is one millisecond, and the RF node delay value 250K is "11" then the respective delay period of time corresponds to 11 milliseconds, which is a multiple thereof "11". RF node 11 will receive the data packet 275 from RF node 1, wait, 11 milliseconds, then broadcast that data packet as an outgoing data packet 276. Because the delay is different (RF node 1 delays 3 milliseconds, RF node 11 delays 11 milliseconds) should both RF node 1 and RF node 11 receive an incoming data packet 275 at the same exact millisecond, the two RF nodes 1, 11 will not rebroadcast their respective outgoing data packet 276 at the same time, preventing a broadcast storm in the nodal wireless network 25.

In some examples, the delay period of time corresponds to the assigned respective RF node delay value 250K, the bit length of the data packet 276, and a multiple thereof. This delay period of time calculation will still result in unique delay periods, because each of the data packets 276 sent by both RF node 1 and RF node 11 are identical, particularly in length. Therefore, if the data packet 276 is 100 bits, and the bitrate of the nodal wireless network 25 is 10,000 bits per second, then the data packet 276 can be transmitted in 10 milliseconds. Therefore, RF node 11 with a node delay value 250K of "11" will delay 11 multiplied by the transmittal time, 10 milliseconds, resulting in a delay of 110 milliseconds. The multiple thereof can be implemented as a safety buffer, for example delaying all messages by an additional 10% to avoid timing issues, but the multiple thereof can also be one.

In this example, the broadcast range 237K of the RF node 11 corresponds to a physical distance or area that the RF node wireless transceiver 213 is capable of broadcasting at a specified RF power level 252K. If the RF power level 252K is increased, then barring issues like blocking topology the broadcast range 237K will increase, and if the RF power level 252K is decreased, then the broadcast range 237K will decrease. When the broadcast range 237K decreases, the RF node 11 has less neighbors: in this example both the sender RF node 1 must have the receiver RF node 11 within the sender RF node broadcast range 237A, and the receiver RF node 11 must have the sender RF node 1 within the receiver RF node broadcast range 237K in order for the RF nodes 1, 11 to be neighbors: in other examples, it is possible to be "one-way" neighbors, where the sender RF node 1 has the receiver RF node 11 within the sender RF node broadcast range 237A, but the receiver RF node 11 does not have the sender RF node within the receiver RF node broadcast range 237K: in such an example, the receiver RF node 11 has the sender RF node 1 as a neighbor, because the receiver RF node 11 receives broadcasts made by the sender RF node, but the sender RF node 1 does not have the receiver RF node 11 as a neighbor because the receiver RF node 11 cannot broadcast outside of the receiver RF node broadcast range 237K and therefore cannot send any broadcasts to the sender RF node 1. The sender RF node 1 would have no direct knowledge of the receiver node 11 existing, and would only be able to ascertain this information indirectly via other RF nodes 2-10, 12 within the RF communication system 20.

The RF node memory 215 includes a respective neighbor delay list 254K that includes respective neighbor RF node delay values 250A, E, J, L of the respective RF node neighbors 1, 5, 10, 12 within the respective broadcast range 237K of the receiver RF node 11.

Furthermore, execution of the delay assignment programming 242 by the RF node processor 211 configures the receiver RF node 11 to implement further functions, including the receiver RF node 11 assigning the respective RF node delay value 250K of the receiver RF node 11 further based on the respective RF node delay values 250A, E, J, L, in the respective neighbor delay list 254K such that the respective RF node delay value 250K of the respective RF node 11 is selected to be different than each of the RF node delay values 250A, E, K, L within the respective neighbor delay list 254. In other words, if the neighbor RF node 1 has a RF node delay value 250A of "3", the neighbor RF node 5 has a RF node delay value 250E of "5", the neighbor RF node 10 has a RF node delay value 250J of "10", and the neighbor RF node 12 has a RF node delay value 250L of "12", then the receiver RF node 11 must select an acceptable RF node delay value 260K that is not equal to any of those values. Acceptable RF node delay values 260K can vary based on examples: in one example, any non-negative number is acceptable, and so RF node 11 can select "3.001" as an RF node delay value 250K that would be an acceptable RF node delay value 260K. In that example, since 3.001 is so close to 3, it is possible that the difference in delay value and consequently delay time is too small, and packet collisions will still occur. Other examples would require that the number be a non-negative integer, and in those examples the RF node 11 can select "10,000,000" as an RF node delay value 250K that would be an acceptable RF node delay value 260K. In such an example, however, ten million milliseconds (or approximately 2.78 hours) is likely far too long of a delay for efficient messaging over the nodal wireless network: a simple 3-way handshake communication would take an entire workday. This is not likely acceptable if the RF communication system 20 is a lighting system, and the 3-way handshake is to turn on a single lightbulb in response to a flick of a light switch. Therefore, in this example, the respective acceptable RF node delay value 260K is a positive integer, and the respective RF node delay value 260K is within a respective RF node delay range 256K, where the respective RF node delay range 256K is an inclusive range of positive integers, with the lower limit 258K equal to one (or "1"), and the upper limit equal to the total number of the plurality of RF node 1-12, or "12". Therefore, when the RF node 11 seeks an acceptable RF node delay value 260K to use as an RF node delay value 250K, the RF node 11 is limited to the set of values "1", "2", "3", "4-", "5", "6", "7", "8", "9", "10", "11", and "12", except that "3", "5", 10" and "12" are already used by neighbor RF nodes 1, 5, 10, 12, and so the actual set the acceptable RF node delay value 260K may be selected from is "1", "2", "4", "6", "7", "8", "9", and "11". The RF node 11 may select "11" as the acceptable RF node delay value 260K and then will set the RF node delay value 250K to "11".

As an alternative example, the respective acceptable RF node delay range 256K can be an inclusive range of positive integers, with the lower limit equal to 1 and the upper limit equal to a total number of the second degree neighbors and first degree neighbors. the respective neighbors 1, 5, 10, 12 within the respective broadcast range 237K of the receiver RF node 11 are first degree neighbors of the receiver RF node, and the respective neighbors 2, 3, 4, 6, 11, 13 of the sender RF node 1 are second degree neighbors of the receiver RF node. This count of second degree neighbors excludes the RF node 11 which is counting the first and second degree neighbors of that RF node 11, and it does not double count any RF nodes 1-10, 12: an RF node 1-12 is only counted once, whether it is a first degree neighbor, a second degree neighbor, or both. Additionally, when there are more than one first degree neighbor, the respective neighbors 1, 2, 3, 4, 5, 6, 8, 9, 10, 11, 12, 13 of each first degree neighbor 1, 5, 10, 12 is included in the count of second degree neighbors.

The means for determining the second degree neighbors is within the incoming delay report message 277A. The delay report message 277A further includes a sender RF node delay value 250A of the sender RF node 1, and the node delay values 250A,B,C,F,K,L within the incoming delay report message 277A comprise the impermissible RF node delay values 281K. The impermissible RF node delay values 281K are of second degree RF nodes of the receiver RF node 11, and once delay report messages 277 are received from all neighbors, the unique RF node delay values 250 within the incoming delay report messages constitutes the impermissible RF node delay values 281K. When selecting the acceptable RF node delay value 260K, the RF node 11 cannot select a value from the impermissible RF node delay values 281K.

The receiver RF node 11 includes delay assignment programming 242 in the RF node memory 215, wherein execution of the delay assignment programming 242 by the RF node processor 211 configures the receiver RF node 11 to implement additional functions, including the receiver RF node 11 updating the respective neighbor delay list 254K by adding the sender RF node delay value 250A of the sender RF node 1 to the respective neighbor delay list 254K. This is the means by which the RF node 11 populates the neighbor delay list: as the incoming delay report message 277A arrives, the sender RF node 1 of that message is a neighbor, and so their RF node delay value 250A is added to the neighbor delay list 254K, and all of the RF node delay values 250 in the incoming delay report message 277A are considered impermissible RF node delay values 281K. Impermissible RF node delay values 281K are likely stored in memory 215, but another example has the impermissible RF node delay values 281K stored in a message, processed, and deleted, not storing the impermissible RF node delay values 281K. Because the impermissible RF node delay values 281K are not broadcast in this process, they do not strictly need to be stored; however, it is efficient to store these impermissible RF node delay values 281K for lookup and reference purposes.

The functions further include the receiver RF node 11 transmitting the updated respective neighbor delay list 254K that includes the render RF node delay value 250A as another delay report message 278K to the first degree neighbors 1, 5, 10, 12 of the receiver RF node 11. This allows those first degree neighbors 1, 5, 10, 12 to more fully populate their respective impermissible RF node delay values 281A and consequently arrive at an acceptable RF node delay value 260A for each RF node 1, 5, 10, 12. As this process propagates and repeats throughout the RF communication system, eventually every RF node 1-12 should have an acceptable RF node delay value 260A.

However, it is possible that every RF node 1-12 cannot have an acceptable RF node delay value 260A using this example method. In an example where the upper limit 259K is less than the total number of RF nodes 1-12 in the RF communication system 20, it is possible that the acceptable RF node delay values are not efficiently distributed. For example, assume RF node 10 is a second receiver RF node and has an upper limit of "3"; RF node 11 has a node delay value 250K of "1", RF node 5 has a node delay value 250E of "2", and RF node 12 has a node delay value 250L of "3". RF node 10 has two neighbors, with node delay values of "1" and "2", leaving only "3" available as an acceptable RF node delay value 260J. However, since RF node 12 is the neighbor of RF node 11, RF node 12 is a second degree neighbor of RF node 10, and because of this RF node 10 cannot use "3" as an acceptable RF node value 260J either. Therefore, there is no acceptable RF node delay value 260K that is different than each of the impermissible RF node delay values 250E, K, L within the sender delay list of impermissible RF node delay values 281J. The RF nodes 1-12 could shuffle around the node delay values 250 each RF node 1-12 uses, but this may not always resolve the blockage. therefore, there is additional delay assignment programming 242 in the memory 215, wherein execution of the delay assignment programming 242 by the RF node processor 211 configures a second receiver RF node 10 to implement functions, including the second receiver RF node 10, while assigning the respective RF node delay value 250K of the second receiver RF node 10, determining that there is no acceptable RF node delay value 260K that is different than each of the impermissible RF node delay values 281J within the sender delay list. The functions further include the second receiver RF node 10, in response to determining that there is no acceptable RF node delay value 260K, reducing a specified RF power level 252J of the RF node wireless transceiver 213 of the second receiver RF node 10, thereby reducing the respective broadcast range 237J of the second receiver RF node 10. This method can reduce the number of neighbors the RF node 10 has, and consequently reduces the number of second degree neighbors of the RF node 10 as well. In this example, if the RF node 10 reduces the broadcast range 237J, RF node 11 will no longer be a neighbor or RF node 10. RF node 11 is still a neighbor or RF node 5, so RF node 10 cannot use RF node delay value 250E "2" as a neighbor of RF node 5, and cannot use RF node delay value 250K "1" as a second degree neighbor of RF node 11, via neighbor RF node 5. However, RF node 10 is no longer a second degree neighbor of RF node 12, because RF node 10 is no longer a neighbor of RF node 11: therefore, RF node 10 may use the same RF node value 250J "3" as the RF node value 250L of RF node 12.

As an alternative, the functions could instead configure the RF node 10 to implement functions, including the second receiver RF node 10, in response to determining that there is no acceptable RF node delay value 260J, increasing the upper limit 259J of the respective RF node delay range 256J of the second receiver RF node 10. This method has the advantage of not reducing the number of total network connections, but does increase messaging delays. Additionally, depending on the design of the RF communication system 20, every RF node 1-12 may use the same upper limit 259J, for consistency and to reduce the probability of not finding an acceptable RF node delay value 260J. In those examples execution of the delay assignment programming 242 by the RF node processor 211 configures the second receiver RF node 10 to implement functions, including the second receiver RF node 10 transmitting an upper limit message 280J that includes the increased upper limit 259J of the respective RF node delay range 256J. Additionally, execution of the delay assignment programming 242 by the RF node processor 211 configures the receiver RF node 11 to implement functions, including functions to receive the upper limit message 279J and, in response to receiving the upper limit message 279J, assign the respective RF upper limit 259K of the receiver RF node 11 to the increased upper limit 259J.

Figure 5:
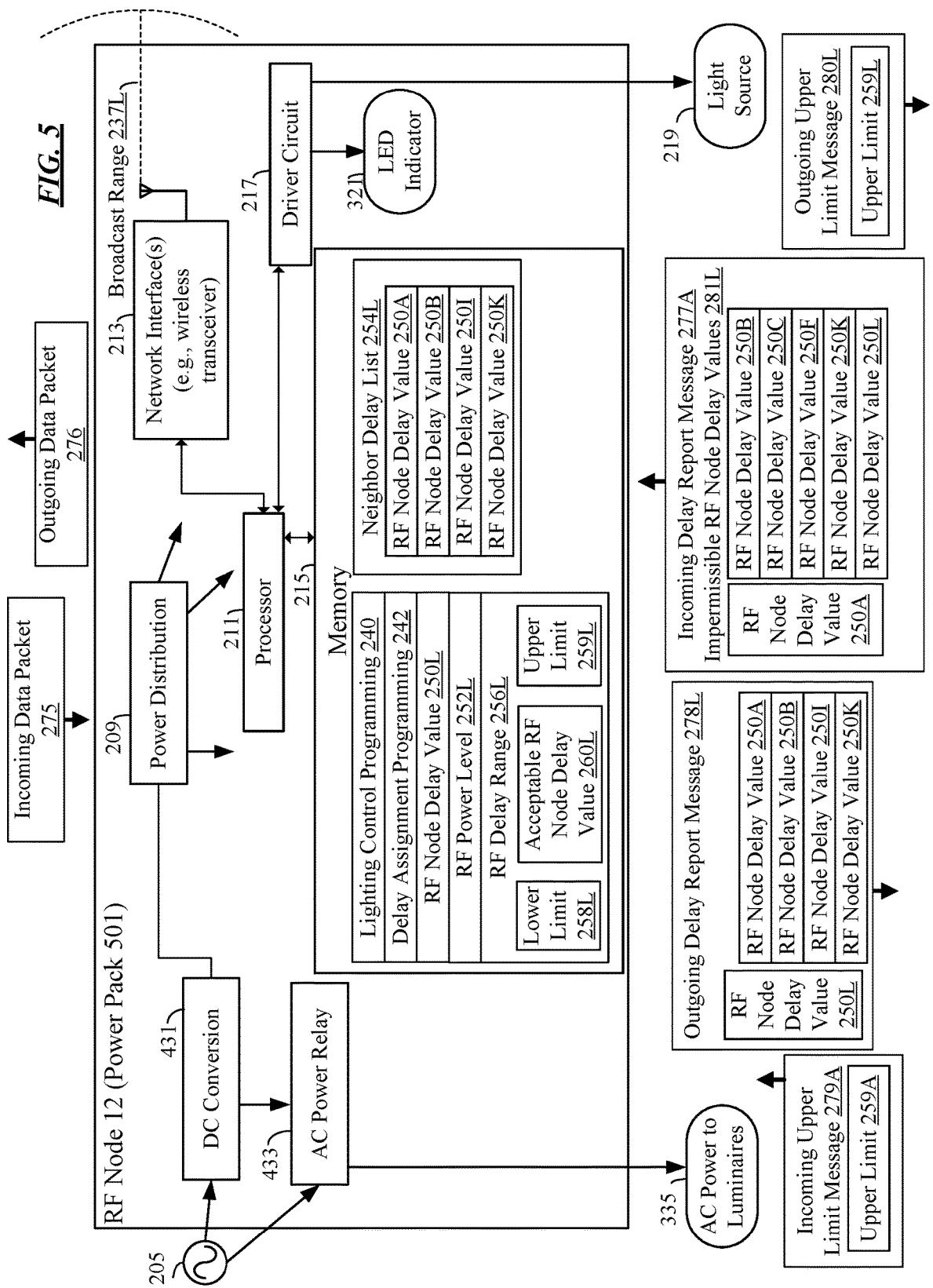
FIG. 5 illustrates a functional block diagram of a lighting system power pack RF node as well as network messages and packets the RF node sends and receives.

FIG. 5 is a block diagram of a power pack 501 that communicates via the nodal wireless network 25 of FIG. 1. The circuitry, hardware, and software of plug load controller 501 shown is similar to the luminaire 200 of FIG. 2 and plug load controller 401 of FIG. 4. Hence, main memory 215 is shown as including the lighting control programming 240.

Power pack 501 is a device that retrofits with existing wired light fixtures (luminaires). The power pack 501 instantiates the wired light fixture by allowing for commissioning and maintenance operations and processes wireless lighting controls in order to allow the lighting device to operate in the lighting system 20.

Memory 215 is shown as including the lighting control programming 240. The memory 215 includes the delay assignment programming 242, RF node delay value 250L, RF power level 252L RF delay range 256L, and neighbor delay list 254L, which have the same structure as the similar element in FIG. 2, but may contain different particular values. The RF node 12 is also capable of receiving the same incoming delay report message 277A and incoming upper limit message 279A that the RF node 1 from FIG. 2 sends, and can send an outgoing delay report message 278L and outgoing upper limit message 280L like the RF node from FIG. 2. Furthermore, the RF node 12 also receives incoming data packet 275 and broadcasts that data packet as an outgoing data packet 276. All of the memory structures and programming within the memory 215 are the same as that of FIG. 2, except for the fact that RF node 12 has RF node 1, RF node 2, RF node 9, and RF node 11 as neighbors, resulting in the neighbor delay list 254J containing the RF node delay value 250A of RF node 1, the RF node delay value 250B of RF node 2, the RF node delay value 250I of RF node 9, and RF node delay value 250K of RF node 11.

FIG. 6 is a functional block diagram of the gateway server 601, by way of just one example of a computing device platform that may perform the functions of the gateway server 601. Gateway server 9 will generally be described as an implementation of a server or host type computer, e.g. as might be configured as a blade device in a server farm or in network room of a particular premises. Gateway server 601 may comprise a mainframe or other type of host computer system. The gateway server 601 communicates with the nodal wireless network 25 RF nodes 1-8 and 10-12 installed in the physical space 21 via the wireless transceiver 213. Gateway server 9 also includes another gateway network interface 619 for off-premises network communications over the WAN 55.

The gateway server 601 in the example includes a processor 611 formed of one or more sub-processors, and a memory 615. The circuitry forming the processor 611 may include a single microprocessor, or may include a number of microprocessors for configuring the computer system as a multi-processor system, or may use a higher speed processing architecture. The main memory 615 in the example includes ROM, RAM and cache memory; although other memory devices may be added or substituted.

The gateway server 601 also includes one or more input/output interfaces for communications, shown by way of example as a gateway network interface 619 for data communications via the WAN 55 as well as a network interface 213 for communications with the other RF nodes 1-8, 10-12. Gateway network interface 619 may be a high-speed modem, an Ethernet (optical, cable or wireless) card or any other appropriate data communications device. The physical communication link(s) to/from the gateway network interface 619 may be optical, wired, or wireless (e.g., via satellite or cellular network).

Although not shown, the computer platform configured as the gateway server 601 may further include appropriate input/output ports for interconnection with a local display and a keyboard and mouse or with a touchscreen or the like, serving as a local user interface for configuration, programming or trouble-shooting purposes. Alternatively, the operations personnel may interact with the computer system of the gateway server 601 for control and programming of the system from remote terminal devices via the Internet or some other link via WAN 55.

The gateway server 601 runs a variety of applications programs and stores various information in a database or the like for control of the fixtures, wall controllers, and any other elements of the lighting system 20 and possibly elements of an overall building managements system (BMS) at the premises. One or more such applications, for example, might enable asset tracking, lighting control through the gateway server 601 and/or lighting control based on input from the sensors or wall controllers.

In the example of FIG. 6 shows a single instance of gateway server 601. Of course, the gateway functions may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like that of the gateway server 601 generally are conventional in nature, and it is presumed that those skilled in the art are sufficiently familiar therewith to understand implementation of the present system and associated lighting control technique using suitable configuration and/or programming of such computer system(s).

Memory 215 is shown as including the lighting control programming 240. The memory 215 includes the delay assignment programming 242, RF node delay value 250I, RF power level 252I, RF delay range 256I, and neighbor delay list 254I, which have the same structure as the similar element in FIG. 2, but may contain different particular values. The RF node 9 is also capable of receiving the same incoming delay report message 277L and incoming upper limit message 279L that the RF node 1 from FIG. 2 could receive, and can send an outgoing delay report message 278I and outgoing upper limit message 280I like the RF node from FIG. 2. Furthermore, the RF node 12 also receives incoming data packet 275 and broadcasts that data packet as an outgoing data packet 276. All of the memory structures and programming within the memory 215 in FIG. 2 are present here in FIG. 6, except for the fact that RF node 9 has RF node 12 as a neighbor, resulting in the neighbor delay list 254I containing the RF node delay value 250L of RF node 12.

Figure 7A:
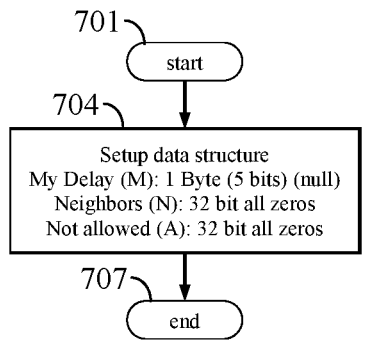
FIGS. 7A-C are flowcharts depicting the back-off timer assignment method, including setup, payload transmission, and delay selection.
Figure 7B:
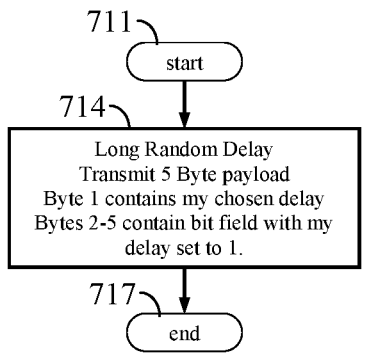
Figure 7C:
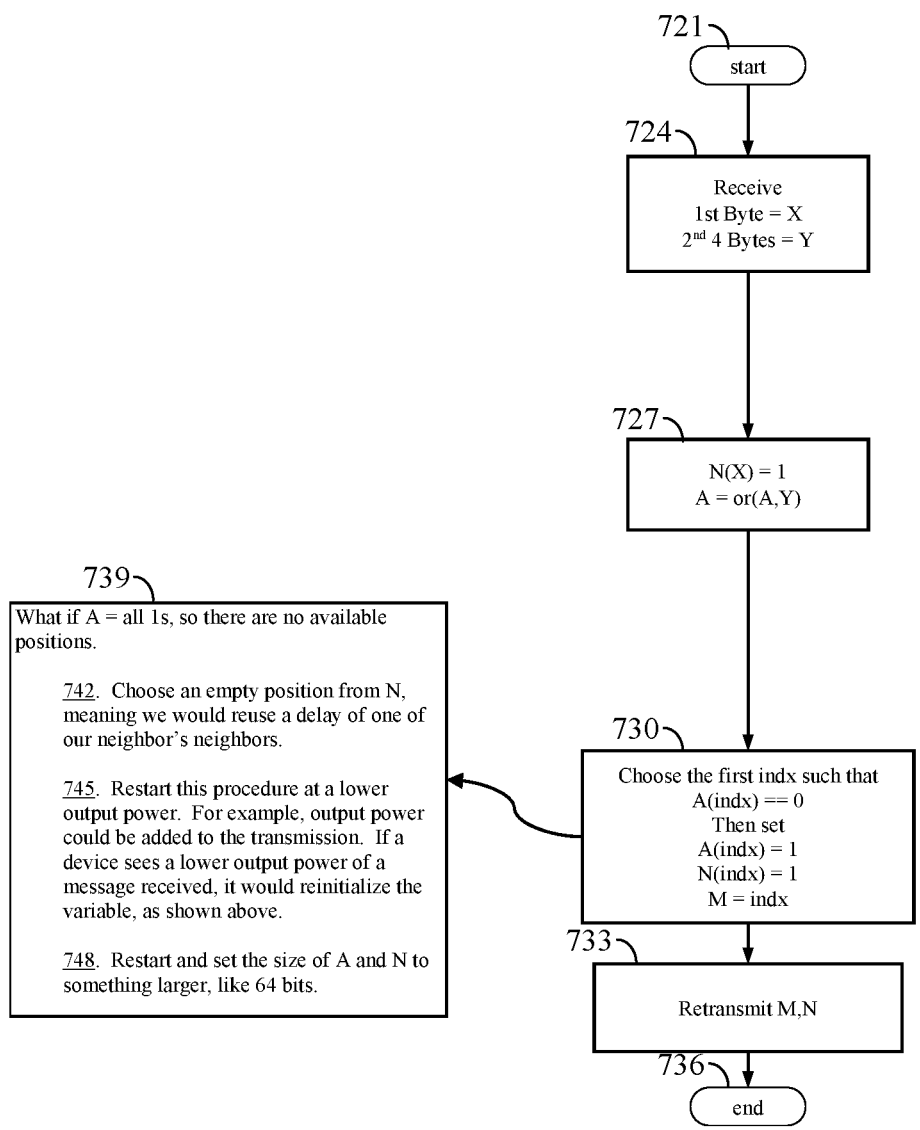

FIGS. 7A-C are flowcharts depicting the back-off timer assignment method, including setup, payload transmission, and delay selection. FIG. 7A shows setup, with operation 701 being the starting point of the setup. The RF node 1 performing the setup creates a bit array in memory 215 during step 704: in this example, there are less than 33 total RF nodes expected in the RF communication system, so the data structure is designed to accommodate 32 different delay values. The first byte or section of the bit array is designed to hold an integer between 0 and 31: a byte of storage in the bit array is allocated for this integer, but only 5 bits need be allocated since only 32 or less RF nodes are expected and log 2 (32)=5. This first byte or section will store the RF node delay value 250A. The second section is 32 bits long, or one bit for each of the 32 different delay values. This second section is the neighbors delay list 254A, and will track which RF node delay values 250A the first degree neighbors of the RF node 1 have selected as acceptable RF node delay values 260A. The third section is also 32 bits long, again one bit for each of the 32 different delay values. This third section is the impermissible RF node delay values 281A, and will track which RF node delay values 250A the second degree neighbors of the RF node 1 have selected as acceptable RF node delay values 260A. The entire bit array is initialized as zero, with the first section particularly initialized as null. At this point, initialization is complete at operation 707. Therefore, FIG. 7A depicts a method comprising setting up a data structure to store a number of values, where the data structure is the bit array in memory 215. The data structure comprises an outgoing decimal number less than or equal to the number of values, where the outgoing decimal number is the RF node delay value 250A. The data structure further comprises an outgoing neighbors bit array, where each bit in the bit array has an address and a value, with a count of addresses equal to the number of values. The outgoing neighbors bit array is the neighbors delay list 254A. The data structure still further comprises an outgoing impermissible bit array, where each bit in the bit array has an address and a value, with a count of addresses equal to the number of values. The impermissible bit array is the impermissible RF node delay values 281A.

After initialization, in FIG. 7B, payload transmission occurs. Operation 711 is where this process begins; it begins with a long random delay. Presuming that RF node 1 has the shortest long random delay in the RF communication system 20, RF node 1 receives no incoming delay report message 277K, and consequently can transmit the payload in operation 714. The payload is the outgoing delay report message 278A, but at this time RF node 1 has no information about any neighbors, and therefore has an empty neighbor delay list 254A. Therefore the outgoing delay report message 278A is transmitted as a 5 byte payload: the first byte is RF node delay value 250A of RF node 1, which will be the decimal value "1" as there is no information directing RF node 1 to select a higher value. The next four bytes are the second section, which has been updated based on the RF node delay value 250A: the 32 bits form a binary number array, wherein the index [0] is set to 1 to indicate that the decimal value "0" has been chosen (Indices are zero-indexed, decimal values are one-indexed, so an index of "0" is equivalent to a decimal value of "1"). If RF node 1 had selected the decimal value "8", then the eighth bit in the four bytes, or the bit at index [7], would have been set to 1 to indicate that the decimal value "8" has been chosen. At this point, the 5 byte payload is transmitted as an outgoing delay report message 278A, and the process concludes in operation 717. Therefore, FIG. 7B depicts a method comprising waiting a long random period of time, with the long random period time as the long random delay. The method further comprises transmitting a first message a distance, with the first message including the outgoing decimal number from FIG. 7A, and the outgoing neighbors bit array from FIG. 7A. The first message is the outgoing delay report message 278A, and the distance is limited by the broadcast range 237A of FIG. 2.

After initialization, but before payload transmission, in FIG. 7C delay selection occurs. The process begins in operation 721: Presuming RF node 11 initialized but had a longer long random delay than RF node 1, RF node 11 will receive the incoming delay report message 277A, and therefore receives the first section of bytes representing the decimal number RF node 1 selected ("1") as the RF node delay value 250A, and a second section of bytes as an array of neighbor delay list 254A and RF node delay values 250A represented in an binary number array, which at this time has a 1 in the index[0], and 0 in indices[1] through [31] in operation 724. In operation 727, RF node 11 takes the decimal value "1" from the incoming delay report message 277A, and updates the second section, or the neighbor delay list 254K, to have at the [0] index the value 1 (N(X=1)). Next, the RF node 11 does a bitwise OR with the second section of bytes in the incoming delay report message 277A with the third section of bytes in the memory of the RF node 11 (A=or(A,Y)). This adds all of the neighbors of RF node 1 to the impermissible RF node delay values 281K of node 11, but because at this point RF node 1 knows no neighbors, and RF node 11 only knows RF node 1, the result is the [0] index of the impermissible RF node delay values 281K being set to 1.

In operation 730, RF node 11 chooses the first available index in the impermissible RF node delay values 281K (the third section in memory) where the indexed value is not equal to 1. At this time, only index [0] is set to 1, so the first index not set to 1, is index [1]. Next, RF node 11 sets index[1] of the impermissible RF node delay values 281K to 1, sets index [1] of the neighbor delay list 254K to 1, and sets the first section in memory, the RF node delay value 250K, to the decimal value "2". Next, in operation 733, that RF node delay value 250K as decimal value "2" and the neighbor delay list 254K as binary array of length 32 are transmitted as outgoing delay report message 277K, which then terminates the process in operation 736.

To illustrate this process further, consider an example where RF nodes 1-11 have all been online and have selected delay values, and RF node 12 is now joining the nodal wireless network 25 for the first time. RF node 12 will receive an incoming node delay message 278A from RF node 1 in operation 724, with the decimal value "1" in the first byte, and a 4 byte binary number array where indices [0], [1], and [2] are set to 1: the other indices are set to 0. In operation 727 RF node 12 sets, for the second section binary number array, index [0] to 1, to represent that "1" is taken by a neighbor RF node. For the third section binary number array, indices [0], [1], and [2] are to 1 to represent that "1", "2", and "3" are not allowed, impermissible RF node delay values 281L.

Next, RF node 12 receives an incoming node delay message 278K from RF node 11 in operation 724, with the decimal value "11" in the first byte, and a 4 byte binary number array where indices [0], [4], [9] and [10] are set to 1: the other indices are set to 0. In operation 727 RF node 12 sets, for the second section binary number array, index [10] to 1, to represent that "11" is taken by a neighbor RF node. For the third section binary number array, indices [4], [9], and [10] are set to 1 to represent that "5", "10", and "11" are not allowed, impermissible RF node delay values 281L. "1" is already an impermissible RF node delay value 281L, and so the index [0] is already set to 1.

Next, RF node 12 receives an incoming node delay message from RF node 2 in operation 724, with the decimal value "2" in the first byte, and a 4 byte binary number array where indices [0], [1], [2], [3], [5], [6], and [10] are set to 1: the other indices are set to 0. In operation 727 RF node 12 sets, for the second section binary number array, index [1] to 1, to represent that "2" is taken by a neighbor RF node. For the third section binary number array, indices [3], [5], and [6] are set to 1 to represent that "4", "6", and "7" are not allowed, impermissible RF node delay values 281L. "1", "2", and "11" are already impermissible RF node delay values 281L, and so the indices [0], [1], and [10] are already set to 1.

Next, RF node 12 receives an incoming node delay message 278I from RF node 9 in operation 724, with the decimal value "9" in the first byte, and a 4 byte binary number array where indices [8] is set to 1: the other indices are set to 0. In operation 727 RF node 12 sets, for the second section binary number array, index [8] to 1, to represent that "9" is taken by a neighbor RF node. For the third section binary number array, indices [8] is set to 1 to represent that "9" is not allowed, an impermissible RF node delay value 281L.

In operation 730, RF node 12 checks for the first index in the third section (the impermissible RF node delay values 281K) where the value is 0. Indices [0][1][2][3][4][5][6][8][9][10] are all set to 1, so the first index set to 0 is [7], which represents the decimal number "8" Therefore, RF node 11 updates the eighth index ([7]) of the third section (impermissible RF node delay values 281L) and the second section (neighbor delay list 254L), then sets the RF node delay value 250L in the first section of the memory 215 to "8". In operation 733, RF node 11 transmits an outgoing node delay message 277L with the decimal value "8" in the first byte, and a binary number array of 0 values, except for the indices [0][1][8][10], which are set to 1 to represent the RF node delay values 250A,B,I,K. RF nodes 1, 2, 9, 11 within broadcast range 237L will receive this message, and update both their second and third sections in the memory 215 containing binary number arrays to have index[7] set to 1, to represent their new neighbor in their neighbor delay list, and new impermissible RF node delay value in their impermissible RF node delay values.

If RF node had been unable to find an available index in the impermissible RF node delay values 281L, there are several operations that are options in operation 739. First, operation 742 indicates that reusing an impermissible RF node delay value 281L that is not in the neighbor delay list 254L would be acceptable: a few packet collisions across the entire nodal wireless network 25 are unlikely to cause material performance issues. Operation 745 has been discussed previously, but the process of sending and receiving messages can be performed at a lower output power, or RF power level 252L. Neighbors seeing a lower power message would free any values used by that RF node 12 sending the lower power messages, and begin the back-off timer assignment method again for that particular RF node 12. Operation 748 has also been discussed previously, and involves increasing the upper 259L of the RF delay range 256L. This would require changing the data structure, as going from 32 to, for example 64 bits means that the first byte holds a 6 bit decimal number, and that the messages will have 6 bytes following the first bit, not 5 bytes, to represent the impermissible values. Other RF nodes 1-11 in the network would likely need to be notified that the message size is changing, or be programmed to detect and handle incoming delay report messages 277L of varying size.

Therefore, FIG. 7C depicts a method comprising receiving a message, where the message is the incoming delay report message 277A. The message includes an incoming decimal number less than or equal to the number of values, which is the RF node delay value 250A. The message further includes an incoming neighbors bit array, where each bit in the bit array has an address and a value, with a count of addresses equal to the number of values, wherein the value of one or more bits in the bit array are set to true. The incoming neighbors bit array is a bit array containing the RF node delay values 250A in the neighbor delay list 254A, along with the RF node delay value 250A of the message sender RF node 1 if the RF node delay value 250A is not in the neighbor delay list 254A. The values of one or more bits in the bit array are set to true because the incoming neighbors bit array will always at least contain the RF node delay value 250A of the message sender RF node 1 set to True.

The method further comprises updating an outgoing neighbors bit array at the address equal to the incoming decimal number, where here the outgoing neighbors bit array is the neighbor delay list 254K, and the address updated is index [0], as this is equal to the incoming RF node delay value 250A of "1". Additionally, the method further comprises updating the outgoing decimal number to a first address in the outgoing impermissible bit array where a corresponding value is false. Here, the outgoing impermissible bit array is the impermissible RF node delay values 281K, and contains the same values as the neighbor delay list 254K. Therefore, the RF node delay value 250K is updated to the value "2", as the first address in the impermissible RF node delay values 281K set to false is index[1].

The method still further comprises updating the outgoing decimal number to the first address in the outgoing neighbor bit array where the corresponding value is set to false when all values in the outgoing impermissible bit array are set to true. When the impermissible RF node delay values 281K are all True, the method chooses a neighbor delay value list 254K with a False value, even if the corresponding RF node delay values 281K address is true.

The method additionally comprises reducing the distance when all values in the outgoing impermissible bit array are set to true. Reducing the broadcast range 237K will ideally reduce the number of neighbors, along with the number of True values in the neighbor delay list 254K, and consequently ideally the number of True values in the impermissible RF node delay values 281K, ideally resulting in available RF node delay values 250K within the impermissible RF node delay values 281K.

The method yet further comprises increasing the number of values when all values in the outgoing impermissible bit array are set to true. If the number of values, or the upper limit 259K, is increased, the size of the neighbor delay list 254K and the impermissible RF node delay values 281K are both increased by the amount of increase in the upper limit 259K, ideally resulting in available RF node delay values 250K within the impermissible RF node delay values 281K.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that has, comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g. approximate, substantially or about), may vary by as much as ±10% from the recited amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected may lie in less than all features of any single disclosed example. Hence, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A radio frequency (RF) communication system, comprising:
   a plurality of RF nodes connected via a nodal wireless network, including a receiver RF node and a sender RF node, wherein each RF node of the plurality of RF nodes includes:
      an RF node processor,
      an RF node wireless transceiver, configured for data communication over the nodal wireless network, coupled to the RF node processor of an RF node,
      an RF node memory coupled to the RF node processor of the RF node including a respective RF node delay value and a respective delay period of time, and
      delay assignment programming in the RF node memory;
   wherein execution of the delay assignment programming by the RF node processor of the sender RF node configures the sender RF node to implement functions, including functions to:
      transmit a data packet to the receiving RF node, and
      transmit a delay report message that includes a sender delay list of impermissible RF node delay values of respective neighbors of the sender RF node, wherein the respective neighbors are within a respective broadcast range of the sender RF node;
   wherein execution of the delay assignment programming by the RF node processor of the receiver RF node configures the receiver RF node to implement functions, including functions to:
      receive the data packet from the sender RF node,
      receive the delay report message from the sender RF node,
      assign the respective RF node delay value of the receiver RF node to a respective acceptable RF node delay value that is different than each of the impermissible RF node delay values within the sender delay list,
      in response to assigning the respective RF node delay value, wait the respective delay period of time, wherein the respective delay period of time corresponds to the assigned respective RF node delay value or a multiple thereof, and
      in response to waiting the respective delay period of time, broadcast the data packet.

2. The RF communication system of claim 1, wherein:
   the respective broadcast range corresponds to a physical distance or area that the RF node wireless transceiver is capable of broadcasting at a specified RF power level;
   the RF node memory of the receiver RF node further includes a respective neighbor delay list that includes respective neighbor RF node delay values of the respective neighbors within the respective broadcast range of the receiver RF node; and
   execution of the delay assignment programming by the RF node processor configures the receiver RF node to implement functions, including functions to:

assign the respective RF node delay value of the receiver RF node further based on the respective RF node delay values in the respective neighbor delay list such that the respective RF node delay value of the respective RF node is selected to be different than each of the RF node delay values within the respective neighbor delay list.

3. The RF communication system of claim 2, wherein:
the respective neighbors within the respective broadcast range of the receiver RF node are first degree neighbors of the receiver RF node; and
the respective neighbors of the sender RF node are second degree neighbors of the receiver RF node.

4. The RF communication system of claim 3, wherein:
the RF node memory includes a respective RF node delay range that includes a lower limit and an upper limit; and
the respective acceptable RF node delay value is within the respective RF node delay range.

5. The RF communication system from claim 4, wherein:
the respective acceptable RF node delay value of the respective RF node is a positive integer; and
the respective acceptable RF node delay range is an inclusive range of positive integers, with the lower limit equal to one (1) and the upper limit equal to a total number of the plurality of RF nodes.

6. The RF communication system from claim 4, wherein:
the respective acceptable RF node delay value of the respective RF node is a positive integer; and
the respective acceptable RF node delay range is an inclusive range of positive integers, with the lower limit equal to 1 and the upper limit equal to a total number of the second degree neighbors and first degree neighbors.

7. The RF communication system of claim 2, wherein:
the delay report message further includes a sender RF node delay value of the sender RF node;
the impermissible RF node delay values are of second degree RF nodes of the receiver RF node, and
delay assignment programming in the RF node memory, wherein execution of the delay assignment programming by the RF node processor configures the receiver RF node to implement functions, including functions to:
update the respective neighbor delay list by adding the sender RF node delay value of the sender RF node to the respective neighbor delay list.

8. The RF communication system of claim 7, wherein:
delay assignment programming in the RF node memory, wherein execution of the delay assignment programming by the RF node processor configures the receiver RF node to implement functions, including functions to:
transmit the updated respective neighbor delay list that includes the sender RF node delay value as another delay report message to the first degree neighbors of the receiver RF node.

9. The RF communication system of claim 1, wherein:
execution of the delay assignment programming by the RF node processor configures a second receiver RF node to implement functions, including functions to:
while assigning the respective RF node delay value of the second receiver RF node, determine that there is no acceptable RF node delay value that is different than each of the impermissible RF node delay values within the sender delay list; and
in response to determining that there is no acceptable RF node delay value, reduce a specified RF power level of the RF node wireless transceiver of the second receiver RF node, thereby reducing the respective broadcast range of the second receiver RF node.

10. The RF communication system of claim 1, wherein:
the RF node memory includes a respective RF node delay range that includes a lower limit and an upper limit;
the respective acceptable RF node delay value is within the respective RF node delay range; and
execution of the delay assignment programming by the RF node processor configures a second receiver RF node to implement functions, including functions to:
while assigning the respective RF node delay value of the second receiver RF node, determine that there is no acceptable RF node delay value that is different than each of the impermissible RF node delay values within the sender delay list, and
in response to determining that there is no acceptable RF node delay value, increase the upper limit of the respective RF node delay range of the second receiver RF node.

11. The RF communication system of claim 10, wherein:
execution of the delay assignment programming by the RF node processor configures the second receiver RF node to implement functions, including functions to transmit an upper limit message that includes the increased upper limit of the respective RF node delay range; and
execution of the delay assignment programming by the RF node processor configures the receiver RF node to implement functions, including functions to:
receive the upper limit message, and
in response to receiving the upper limit message, assign the respective RF node upper limit of the receiver RF node to the increased upper limit.

12. The RF communication system if claim 1, wherein execution of the delay assignment programming by the RF node processor of the sender RF node configures the sender RF node to implement functions, including functions to:
during initialization, wait an initialization period of time prior to transmitting the delay report message that is sufficient to avoid collisions by the plurality of RF nodes.

13. The RF communication system from claim 1, wherein:
the respective delay period of time corresponds to the assigned respective RF node delay value, a bit length of the data packet, and a multiple thereof.

14. The RF communication system of claim 1, wherein the RF communication system is a wireless industrial device control system.

15. The RF communication system of claim 1, wherein the RF communication system is a wireless lighting system.

16. The RF communication system of claim 15, wherein:
the plurality of RF nodes include a luminaire and a lighting control device;
the luminaire includes a light source; and
the lighting control device is coupled to control the luminaire via the nodal wireless network.

* * * * *